(12) United States Patent
Shi et al.

(10) Patent No.: US 6,754,645 B2
(45) Date of Patent: Jun. 22, 2004

(54) VOLTAGE-MODE PULSE WIDTH MODULATION VLSI IMPLEMENTATION OF NEURAL NETWORKS

(75) Inventors: Bingxue Shi, Beijing (CN); Chun Lu, Beijing (CN)

(73) Assignee: Winbond Electronics Corp., Hsinchu (TW)

(*) Notice: Subject to any disclaimer, the term of this patent is extended or adjusted under 35 U.S.C. 154(b) by 506 days.

(21) Appl. No.: 09/812,982

(22) Filed: Mar. 20, 2001

(65) Prior Publication Data

US 2002/0169729 A1 Nov. 14, 2002

(51) Int. Cl.[7] ............................ G06F 15/18; G06G 7/00
(52) U.S. Cl. ............................ 706/35; 706/38; 706/33
(58) Field of Search ............................ 706/35, 33, 26, 706/38, 36, 34, 39

(56) References Cited

U.S. PATENT DOCUMENTS

| | | | | |
|---|---|---|---|---|
| 4,893,255 A | * | 1/1990 | Tomlinson, Jr. ............... | 706/35 |
| 5,165,009 A | * | 11/1992 | Watanabe et al. ............. | 706/41 |
| 5,165,010 A | * | 11/1992 | Masuda et al. ............... | 706/42 |
| 5,426,757 A | * | 6/1995 | Watanabe et al. ........... | 711/101 |
| 5,594,916 A | * | 1/1997 | Watanabe et al. ........... | 711/150 |
| 5,671,337 A | * | 9/1997 | Yoshihara .................... | 706/43 |
| 5,696,883 A | * | 12/1997 | Arima ......................... | 706/38 |
| 5,875,347 A | * | 2/1999 | Watanabe et al. ............. | 712/1 |
| 2002/0032670 A1 | * | 3/2002 | Watanabe et al. ............. | 706/33 |

OTHER PUBLICATIONS

Dayhoff, J., "Pattern mapping in Pulse Transmission Neural Networks", Proceedings of the conference on analysis of neural network applications, 1991, pp. 146–159.*

Gu et al., "A Novel Current–Mode Fuzzy Processor for Pattern Recognition", 4th International Conference on Signal Processing Oct. 1998, vol. 1, pp. 541–544.*

Gu et al., "A Novel Switched–Current Sorter Based on Magnitude", 5th International Conference on Solid–State and Integrated Circuit Technology, Oct. 1998, pp. 393–396.*

Chen et al., "CMOS PWM VLSI Implementation of Neural Network", Proceedings of the IEEE–INNS–ENNS International Joint Conference on Neural Networks, Jul. 2000, vol. 3, pp. 485–488.*

Chen et al., "Building Blocks for PWM VLSI Network", 5th International Conference on Signal Processing, Aug. 2000 vol. 1, pp. 563–566.*

Lazzaro, J., "Low–Power Silicon Spiking Neurons and Axons", IEEE International Symposium on Circuits and Systems, 1992.*

Astaras et al., "Pulse–Based Circuits and Methods from Probabilistic Neural Computing", Proceedings of the 7th International Conference on Microelectronics for Neural, Fuzzy and Bio–Inspired Systems, Apr. 1999, pp. 96–102.*

Reyneri, L.M., "A Performance Analysis of Pulse Stream Neural and Fuzzy Computing Systems", IEEE Transactions on Circuit and Systems II: Analog and Digital Signal Processing, Oct. 1995, Vol 42, Iss 10, pp. 642–660.*

* cited by examiner

*Primary Examiner*—Wilbert L. Starks, Jr.
*Assistant Examiner*—Kelvin Booker
(74) *Attorney, Agent, or Firm*—Ladas & Parry

(57) ABSTRACT

A voltage-mode pulse width modulation (PWM) VLSI implementation of neural networks, comprising: a voltage-pulse converter for converting an input voltage into a neuron-state pulse; a synapse multiplier, including a multiplier cell for multiplying the neuron-state pulse by an input weight voltage and an integral and summation cell for integrating and summing up the multiplied output and producing a first output voltage; and a sigmoid circuit for converting the first output voltage into a second output voltage with the non-linear activation function of neuron.

19 Claims, 13 Drawing Sheets

VOLTAGE-MODE PULSE WIDTH MODULATION VLSI IMPLEMENTATION OF NEURAL NETWORKS

BACKGROUND OF THE INVENTION

1. Field of the Invention

This invention relates to a neural network, particularly to a VLSI implementation of neural networks. It shortens the convergence time and eliminates the influence of the initial value by using the GA features, thereby achieving the conservation of hardware resources.

2. Description of the Related Art

Because of its independence on specific model of signal processing, artificial neural networks (ANN) is now widely used in the fields of image processing and pattern recognition. Refer to FIG. 1. A multilayer neural network typically comprising an input layer, an output layer, and a hidden layer. The input layer having a row of cells 1, . . . , 2 or neuron-like units (not shown) serves as an interconnect function, externally connecting a plurality of inputs $x1, \ldots, x_n$ to the network, wherein each input is coupled to a respective input cell. The hidden layer having a plurality of neuron cells 3, . . . , 4, which is the most important part in the network and has multiple inputs and one output, is responsible for performing the specific functions of the network, wherein the output of each input cell in the input layer is coupled to each of a plurality of neuron cells in the hidden layer. For example, the specific functions can be that each neuron cell multiplies the inputs $x1, \ldots, x_n$ by a given weight $w_1, w_2, \ldots, w_3, w_4$ and adds the products together, as shown in 3 and 4 in the hidden layer. The output layer having at least one cell 5 or neuron-like unit (not shown) serves as the output collection of a plurality of neuron cells 3, . . . , 4 in the hidden layer. For such a network, although now the majorities of neural systems are realized by software simulations, only hardware implementations can fully utilize its advantages of parallel processing and error tolerance. Among the existing 3 methods of VLSI implementation for neural systems, analog circuit has the merits of small chip area, fast speed and low power consumption, but is susceptible to process parameters and interface noises. Digital circuit has the merits of high precision and robustness, but it is area and power consuming. The digit-analog hybrid method—pulse stream technique combines both the merits of analog and digital methods. It uses digital signal to control analog multiplication, so the area of synapse analog multiplier is small and the neuron digital state signal is immune to noise. Among the various kinds of pulse modulation techniques, pulse width modulation (PWM) is the easiest for circuit implementation, so the PWM VLSI neural network is widely studied.

Although the first proposed structure of 3-transistor synapse multiplier is simple, it has low precision and small linearity range because of the switching noise and working states of the transistors. Furthermore, it uses external non-linear voltages for activation function, which is not suitable for VLSI implementation because of the limited interface. A low gain 2-transistor amplifier is adopted for activation function, but its transfer characteristic is quite different from the ideal sigmoid function, so it is not suitable for ANNs which use Back Propagation (BP) learning algorithm. Although the transfer characteristic of asynchronous neuron proposed is very similar to ideal sigmoid function, it needs complex BiCMOS process. Another novel neuron circuit can easily realize both sigmoid function and its derivative, but its current input is not suitable for voltage-mode sigmoid circuit.

SUMMARY OF THE INVENTION

Therefore, an object of the invention is to provide a new building blocks for PWM VLSI neural network, including a simple precise synapse multiplier with large linearity range and a voltages-pulse converter with high precision.

Another object of the invention is to provide a CMOS voltage-mode sigmoid circuit with adjustable gain, whose transfer function is similar to ideal sigmoid function.

To realize the above and other objects, the invention provides a voltage-mode pulse width modulation (PWM) VLSI implementation of neural networks, including a simple precise synapse multiplier with large linearity range and a voltages-pulse converter with high precision. Further, A CMOS voltage-mode sigmoid circuit with adjustable gain is designed, whose transfer function is similar to ideal sigmoid function, thereby constructing a 2-2-1 feedforward PWM ANN.

BRIEF DESCRIPTION OF THE DRAWINGS

The invention will become apparent by referring to the following detailed description of a preferred embodiment with reference to the accompanying drawings, wherein:

FIG. 4b illustrates the simulation result of the converter of FIG. 4a;

FIG. 5b illustrates the simulation result of the non-linear neuron cell of FIG. 5a;

FIG. 6b is the circuit structure of FIG. 6a; and

DETAILED DESCRIPTION OF THE INVENTION

In a single layer, there is no hidden neurons. Consequently, it cannot classify input patterns that are not linearly separable. However, nonlinearly separable patterns are of common occurrence. The well-known example is the XOR problem. The single layer cannot construct a straight decision line for the recognition of Exclusive-Or (XOR) logic operands. Further, the training algorithm often converges to a local minimum, which is not the optimum solution. The optimum solution would be a global minimum for a given set of examples. Hence, a 2-2-1 feedforward PWM ANN is constructed to verify a building blocks, the simulation result shows its ability to solve AND, OR and XOR problems.

In this embodiment, choose pulse width modulation (PWM) for the VLSI neural network implementation because it is the easiest for circuit implementation among the various kinds of pulse modulation techniques. So, the building blocks for PWM VLSI neural networks are designed, including a simple precise synapse multiplier with large linearity range and a voltage-pulse converter with high precision. A CMOS voltage-mode sigmoid circuit with adjustable gain is designed, whose transfer function is similar to the ideal sigmoid function. The detail description is followed.

Synapse Multiplier

Figure 1:
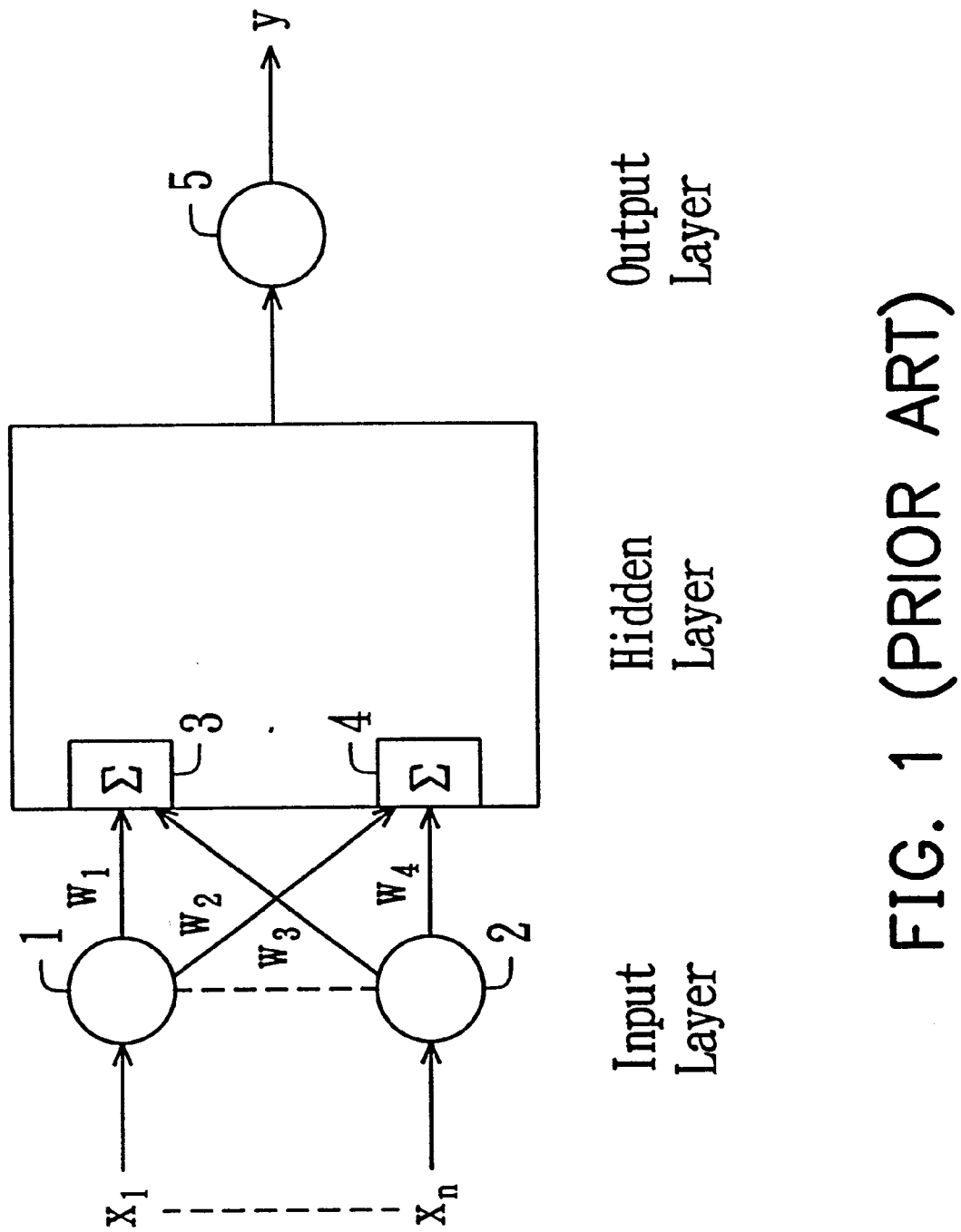
FIG. 1 is a schematic diagram of a conventional neural network.
Figure 2:
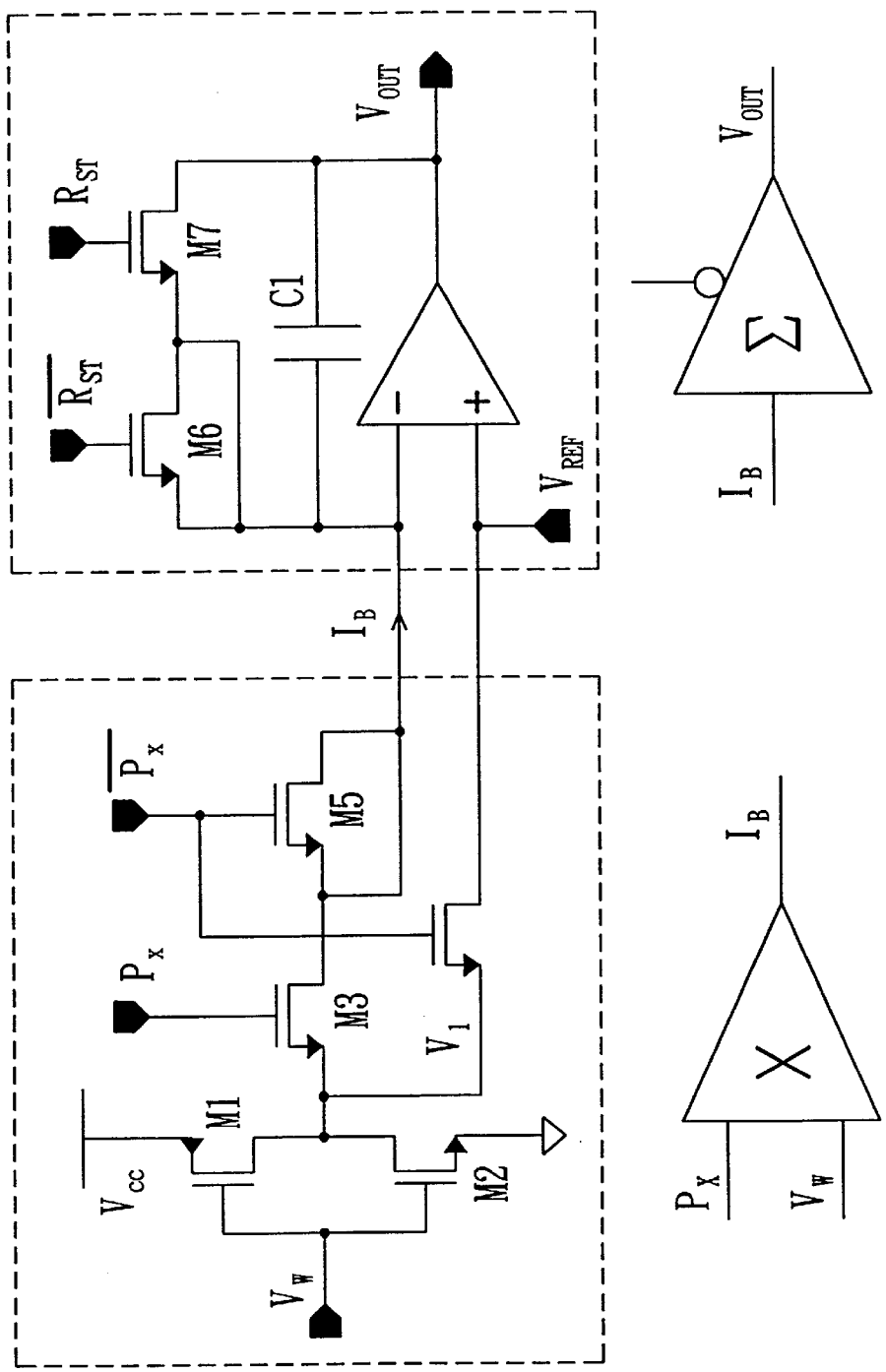
FIG. 2 illustrates a synapse multiplier of the invention.

Refer to FIG. 2, showing a PWM synapse multiplier. In FIG. 2, the circuit in left dash block is multiple cell, while that in the right dash block is integral and summation cell. Vw is input weight voltage, Px is input pulse of neuron state, $R_{ST}$ is reset control signal, and $V_{OUT}$ is output voltage.

As shown in FIG. 2, M1 and M2 act as a voltage-current converter, the difference of it of M1 and M2's drain-source current $I_B$ can be expressed as $$I_B = -2\kappa_1 (Vcc - 2V_{TN})\left(Vw - \frac{1}{2}Vcc\right) \qquad (1)$$

If $V_{REF} + V_{TP} \leq Vw \leq V_{REF} + V_{TN}$, $\kappa_1 = \kappa_2$, $V_{TN} = -V_{TP}$ and $Vcc = 2 V_{REF}$ exist; where $V_{TP}$ and $V_{TN}$ are PMOS and NMOS threshold voltages, $\kappa_1$ and $\kappa_2$ are conducting factors of M1 and M2 respectively.

When $R_{ST}$ is high, Vout can be reset to reference voltage $V_{REF}$. After $R_{ST}$ drops to low, $I_B$ begins to charge capacitor C1, this charging process is controlled by Px via M3, and the charging time is equal to $T_{WIDTH}$ which is the pulse width of Px. So the final result of the multiplier can be expressed as $$V_{OUT} - \frac{1}{2}Vcc = -\frac{2\kappa_1 \cdot T_{WIDTH}}{C1}(Vcc - 2V_{TN})\left(Vw - \frac{1}{2}Vcc\right) \qquad (2)$$

When M3 is turned on, M4 will be turned off, so $V_1$ still equals to $V_{REF}$. This means the working states of M1 and M2 will not change when M3 is on or off, so the precision of the multiplier will be improved. To reduce the feedthrough effects of Px and $R_{ST}$, dummy MOSFETs M5 and M6 are added, whose W/L dimensions are ½ of M3 and M7 respectively. They can greatly reduce the switching noises at the negative input of the operational amplifier.

Figure 3A:
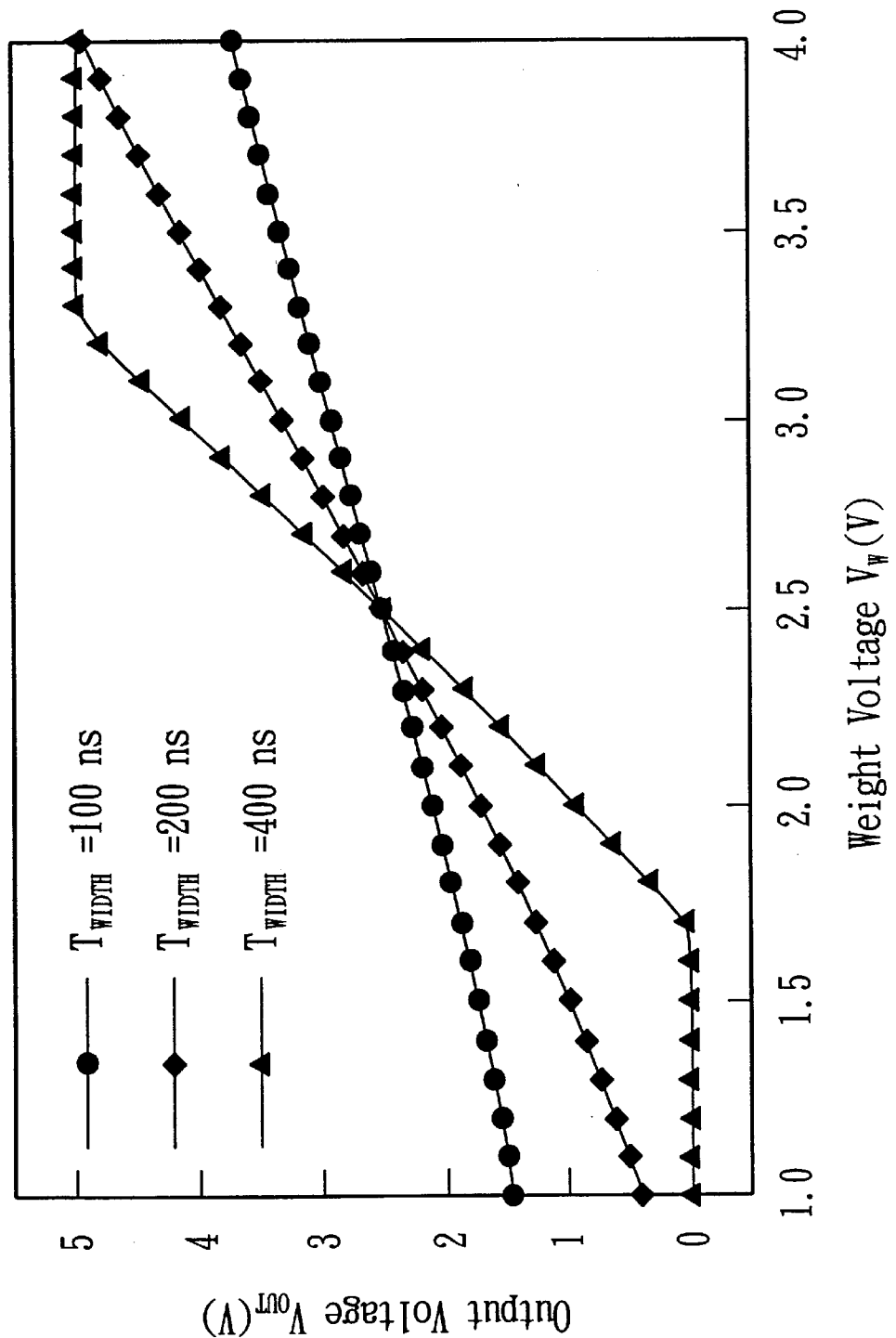
FIGS. 3a–3d illustrate the simulation results of the synapse multiplier.
Figure 3B:
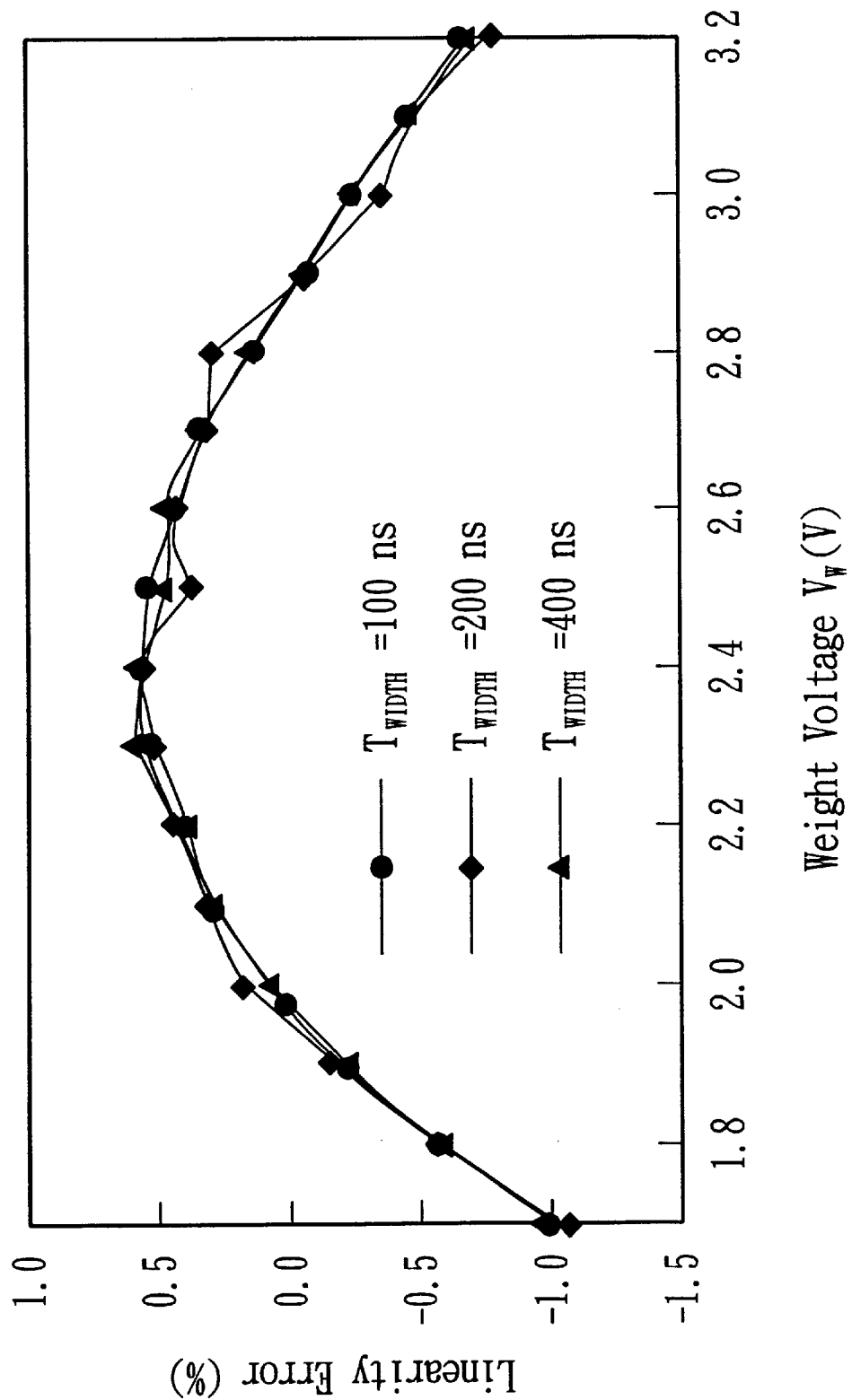
Figure 3C:
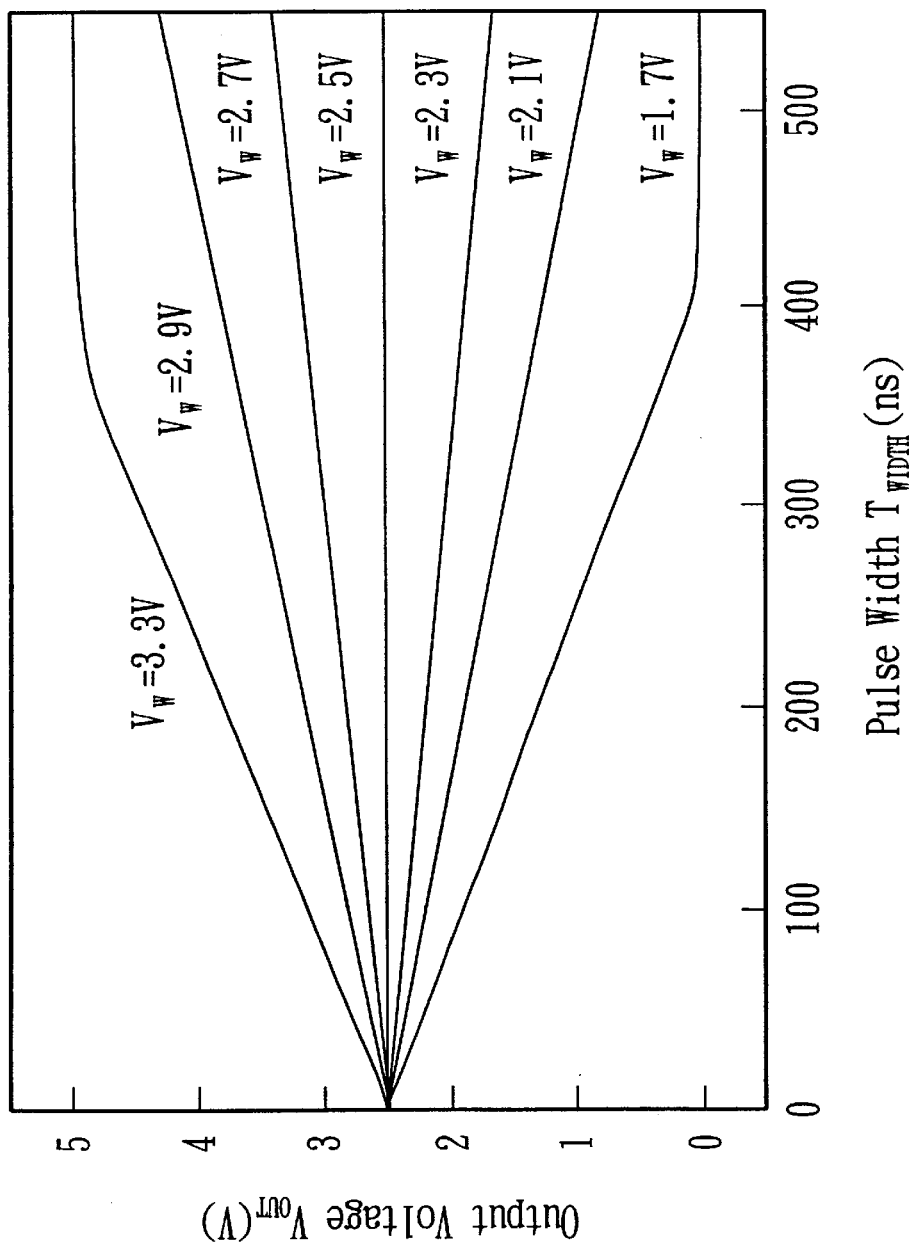
Figure 3D:
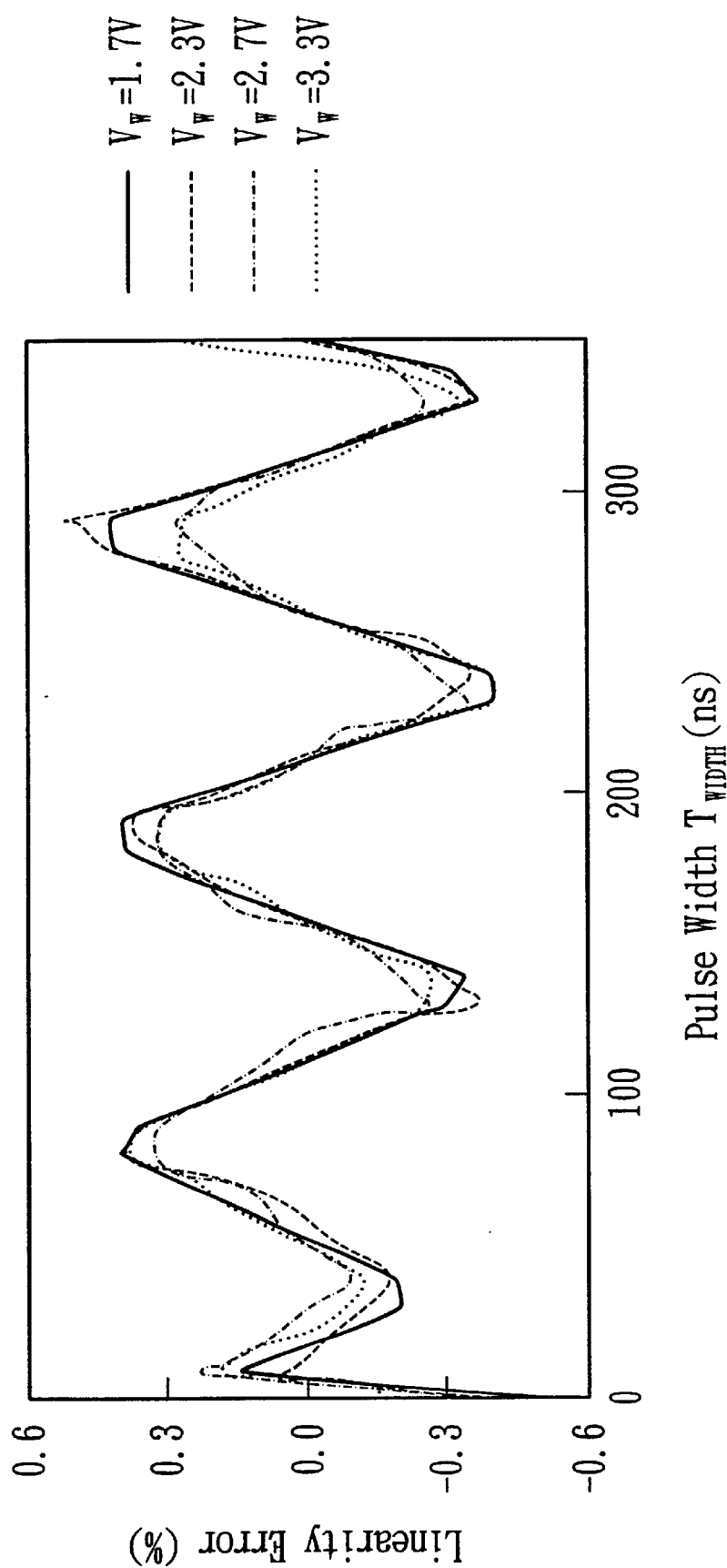

The Spectre simulation result of the synapse multiplier under Cadence Analog Artist Environment is shown in FIGS. 3a and 3b. The 3 curves in FIG. 3a represent 3 different pulse widths. When $T_{WIDTH}$ is 200 ns, the input voltage linearity range of this multiplier can be ±1.5V. When $T_{WIDTH}$ is 400 ns, the linearity range is only about ±0.7V because of the limited saturation voltage of the operational amplifier. According to the numerical analysis, it can be seen in FIG. 3b that the linearity errors of the 3 curve are below 1% when Vw is in the range from 1.8V to 3.2V. The 7 curves in FIG. 3c represent 7 weight voltages. They have good linearity when $T_{WIDTH}$ is in the range from 0 ns to 350 ns, the numerical analysis results of 4 curves in FIG. 3d show their linearity errors are below 0.4%. According to FIG. 3a, the ideal function of this synapse multiplier can be expressed as $$V_{OUT}(V) - 2.5 = (Vw(V) - 2.5) \times \frac{T_{WIDTH}(ns)}{126} \qquad (3)$$

[Voltage-pulse Converter]

In PWM ANN, neuron state is represented and transferred by pulse signal, so it is necessary to convert voltage to pulse. The schematic and symbol of voltage-pulse converter is shown in FIG. 4a, where $V_V$ is input voltage, $C_{TRL}$ is controlling signal and $V_P$ is output pulse signal.

When $C_{TRL}$ is high, voltage $V_1$ on capacitor C1 is 0V and $V_P$ is also low. When $C_{TRL}$ drops to low, $V_P$ will jump to high immediately and $V_1$ will begin to increase linearly from 0V. Once $V_1$ exceeds $V_V$, the comparator will overturn, then $V_P$ will drop to low. So the pulse width of $V_P$ is proportional to $V_V$.

Figure 4A:
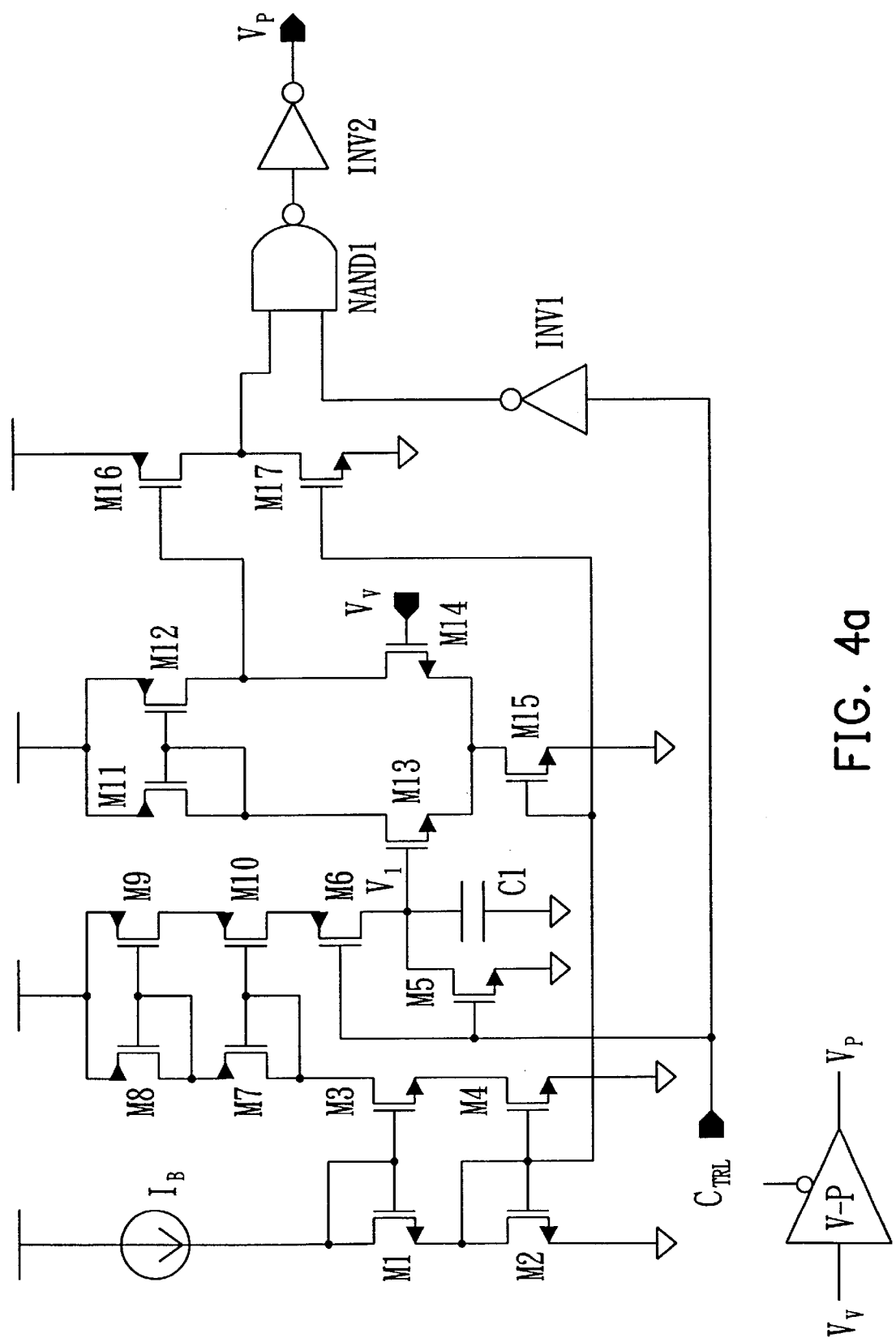
FIG. 4a illustrates a converter of the invention.
Figure 4B:
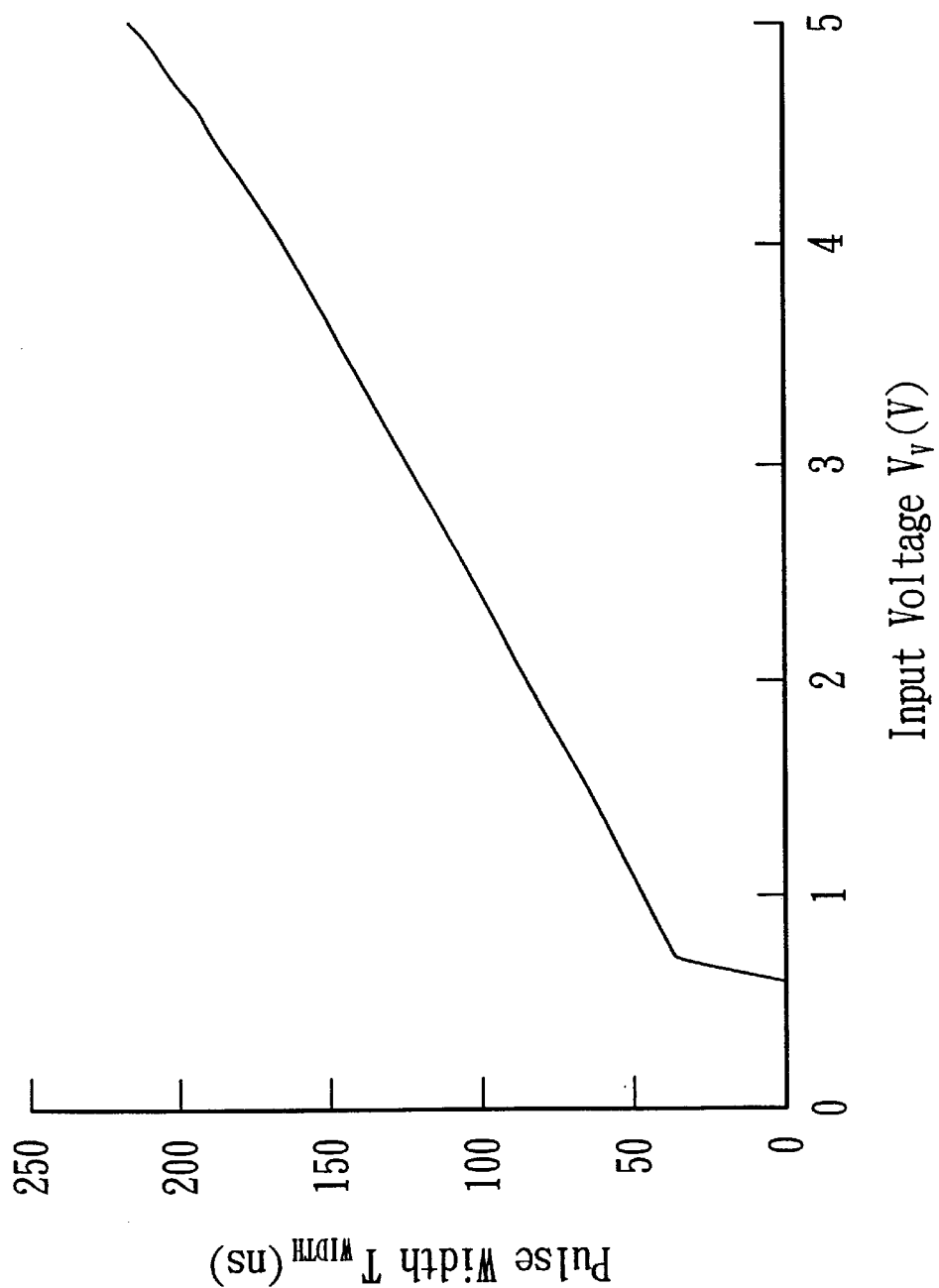

The simulation result is shown in FIG. 4b. When $V_V$ is in the range from 0.7V to 5V, the conversion curve maintains good linearity. But when $V_V$ is below 0.7V, $T_{WIDTH}$ is 0 ns. The cause is that when $V_V$ is lower than MOSFET threshold voltage, the comparator can not work correctly, so $V_P$ maintains low voltage. This problem is not important because it can be corrected by adjusting the weight learning algorithm.

According to FIG. 4a, the ideal function of this voltage-pulse converter can be expressed as $$T_{WIDTH}(ns) = 42.1 \times V_V(V) \qquad (4)$$

[Sigmoid Circuit]

Figure 5A:
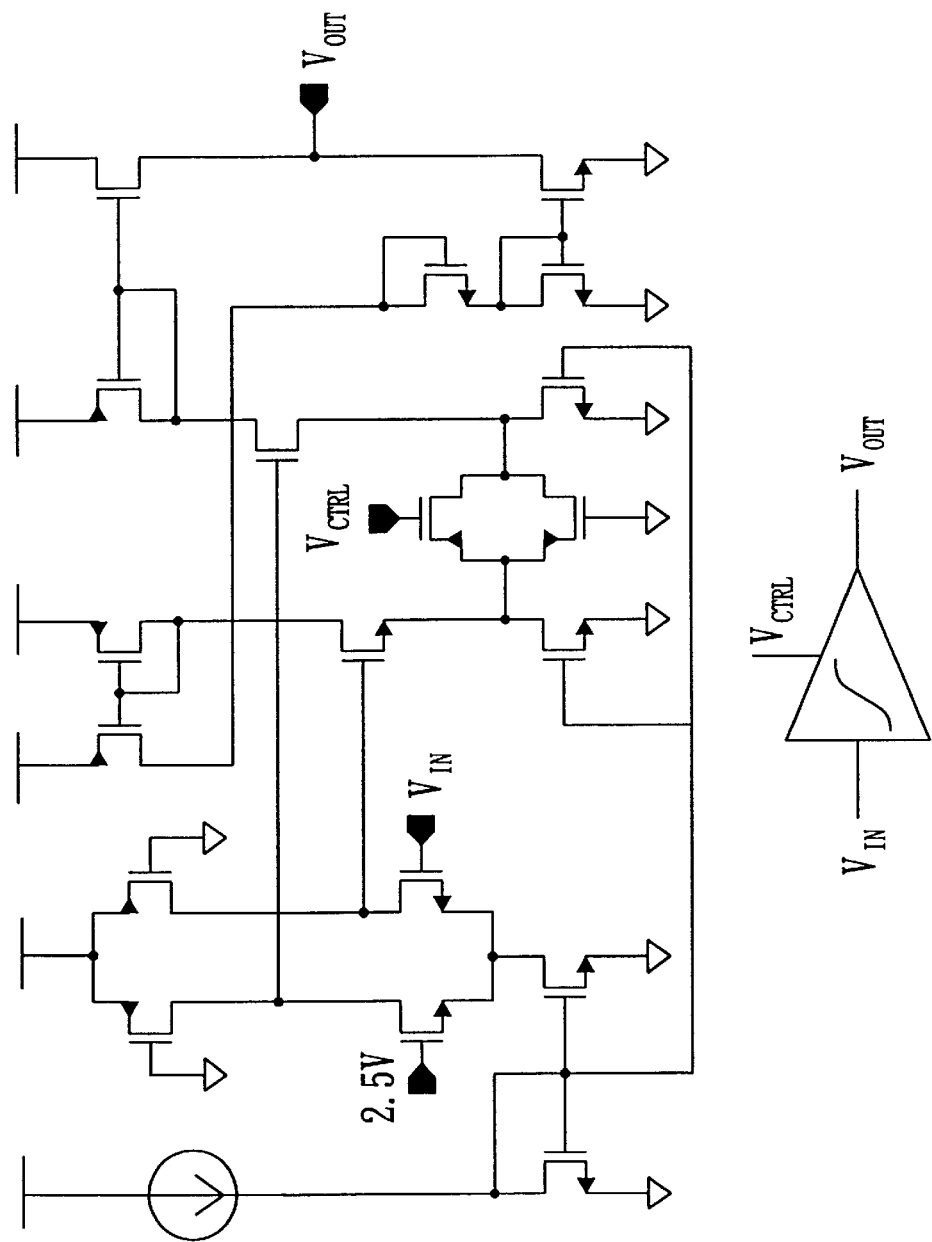
FIG. 5a illustrates a non-linear neuron cell of the invention.
Figure 5B:
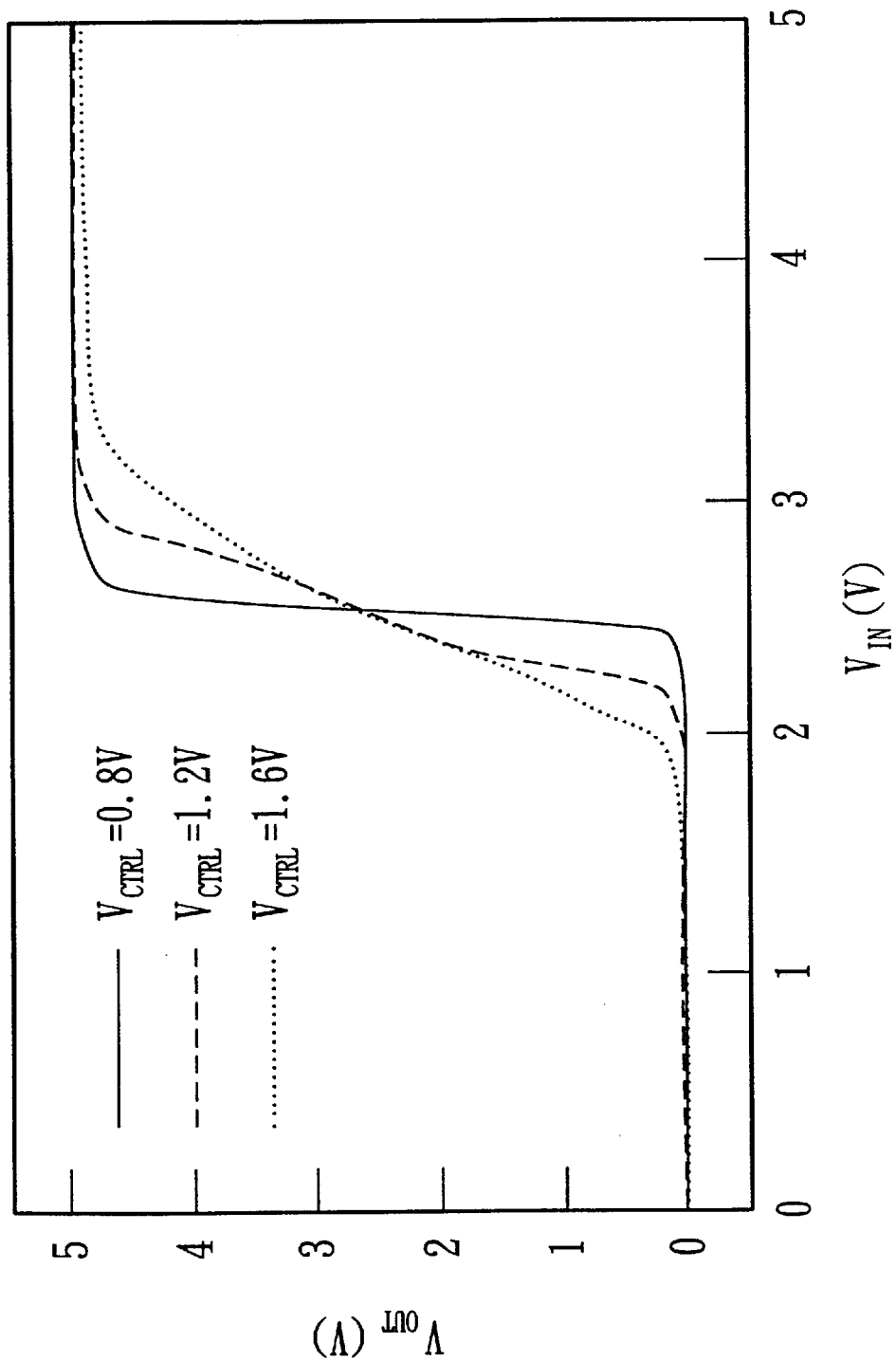

To implement the non-linear activation function of neuron, a voltage-mode sigmoid function circuit with adjustable gain is designed. It is shown in FIG. 5a, where $V_{IN}$ is input voltage, $V_{OUT}$ is output voltage and $V_{CTRL}$ is gain-controlling voltage. Its simulation result is shown in FIG. 5b. When $V_{CTRL}$ equals 1.6V, its function can be expressed as $$V_{OUT} = \frac{5}{1 + e^{-4(V_{IN} - 2.5)}} \qquad (5)$$

[PWM VLSI ANN Design Integration]

Figure 6A:
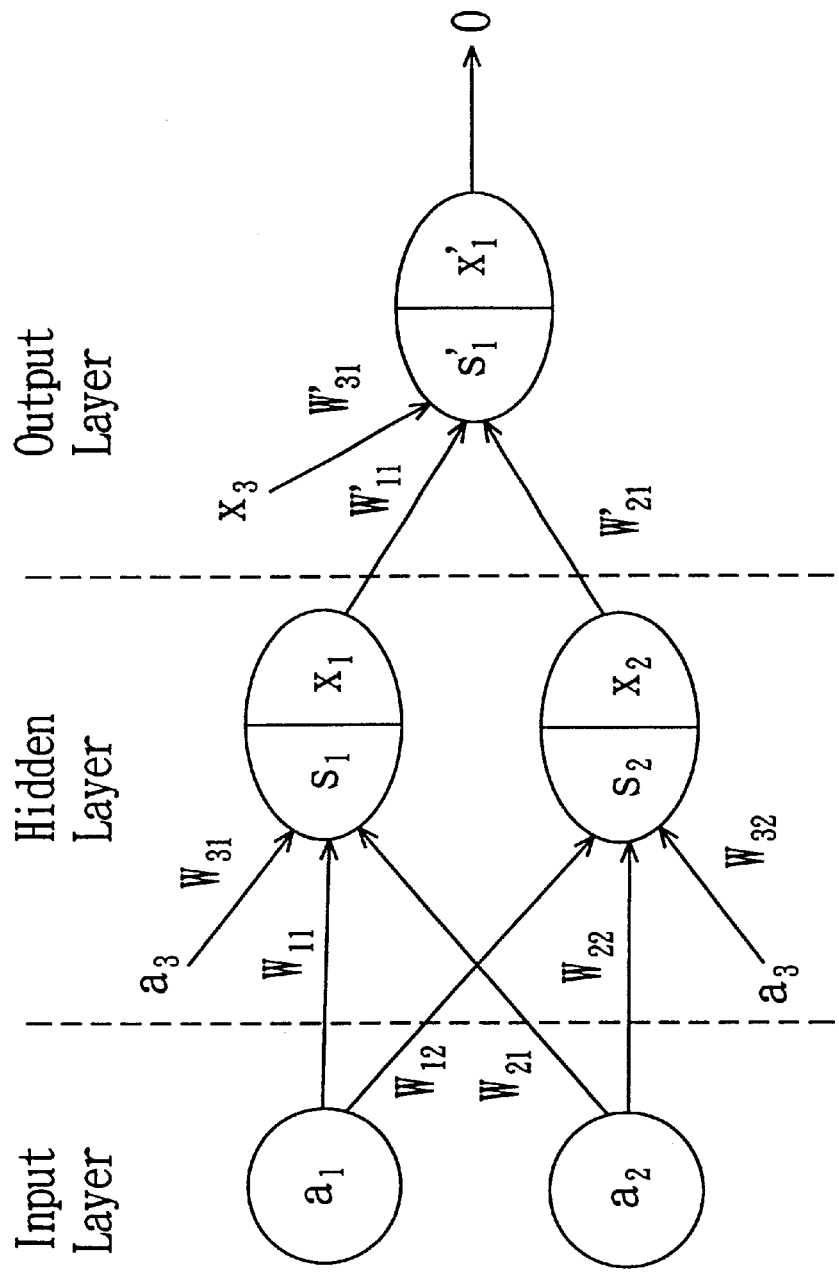
FIG. 6a is an embodiment of the invention.
Figure 6B:
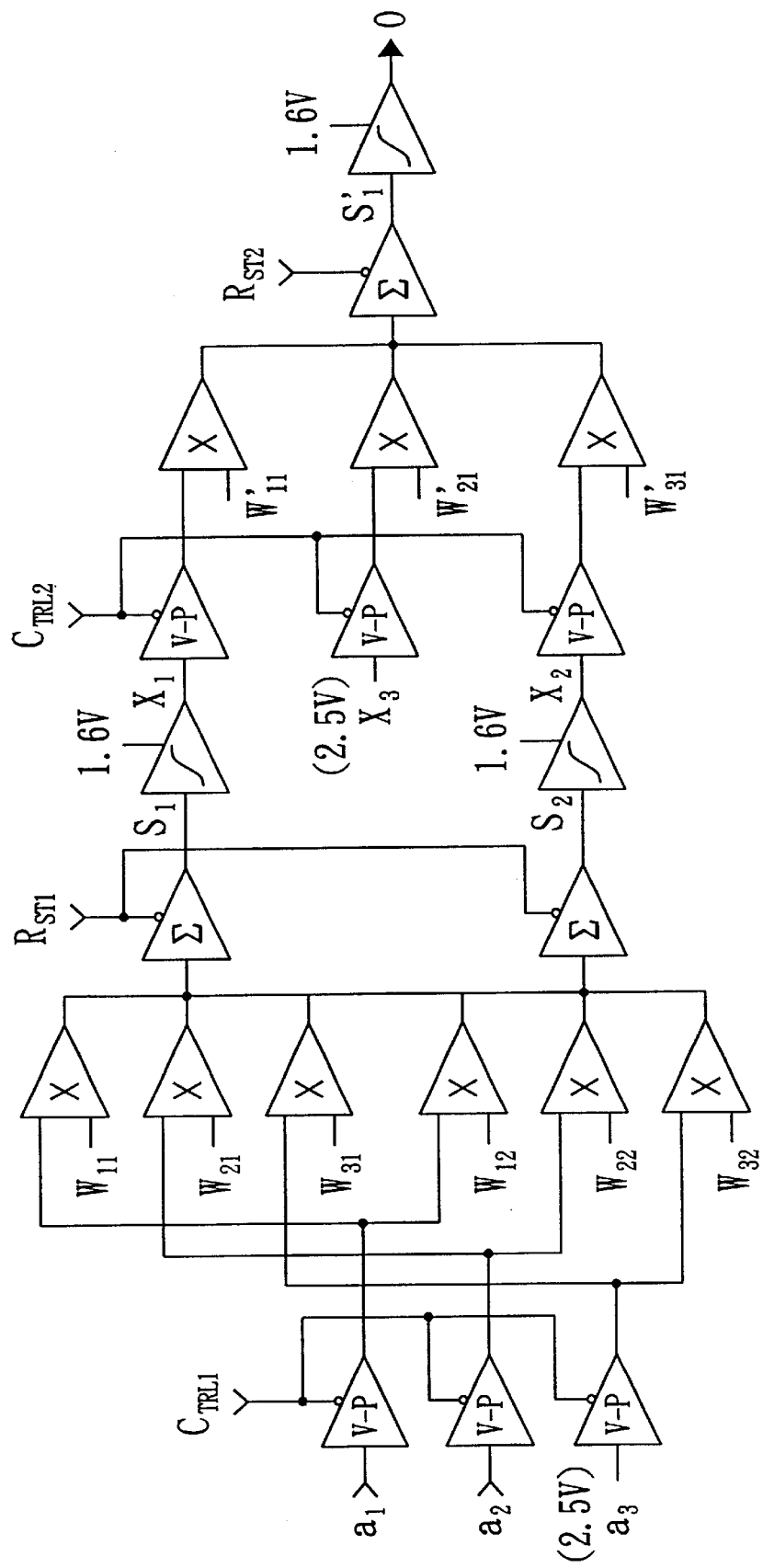

Any feedforward PWM VLSI ANNs can be constructed by the above building blocks. For verification, a 2-2-1 feedforward ANN is designed which can solve AND, OR and XOR problems. Its network and circuit structures are shown in FIGS. 6a and 6b respectively, where $a_1$ and $a_2$ are input signals, o is the output signal. $C_{TRL1}$ and $C_{TRL2}$ are used to control the voltage-pulse conversion in input layer and hidden layer, $R_{SR1}$ and $R_{ST2}$ are used to reset hidden and output neurons respectively. BP algorithm is used for training. Because the multiplication and sigmoid transformation of the circuit are not ideal, the iterative equations of the BP algorithm are adjusted according to the circuit characteristics.

Figure 6C:
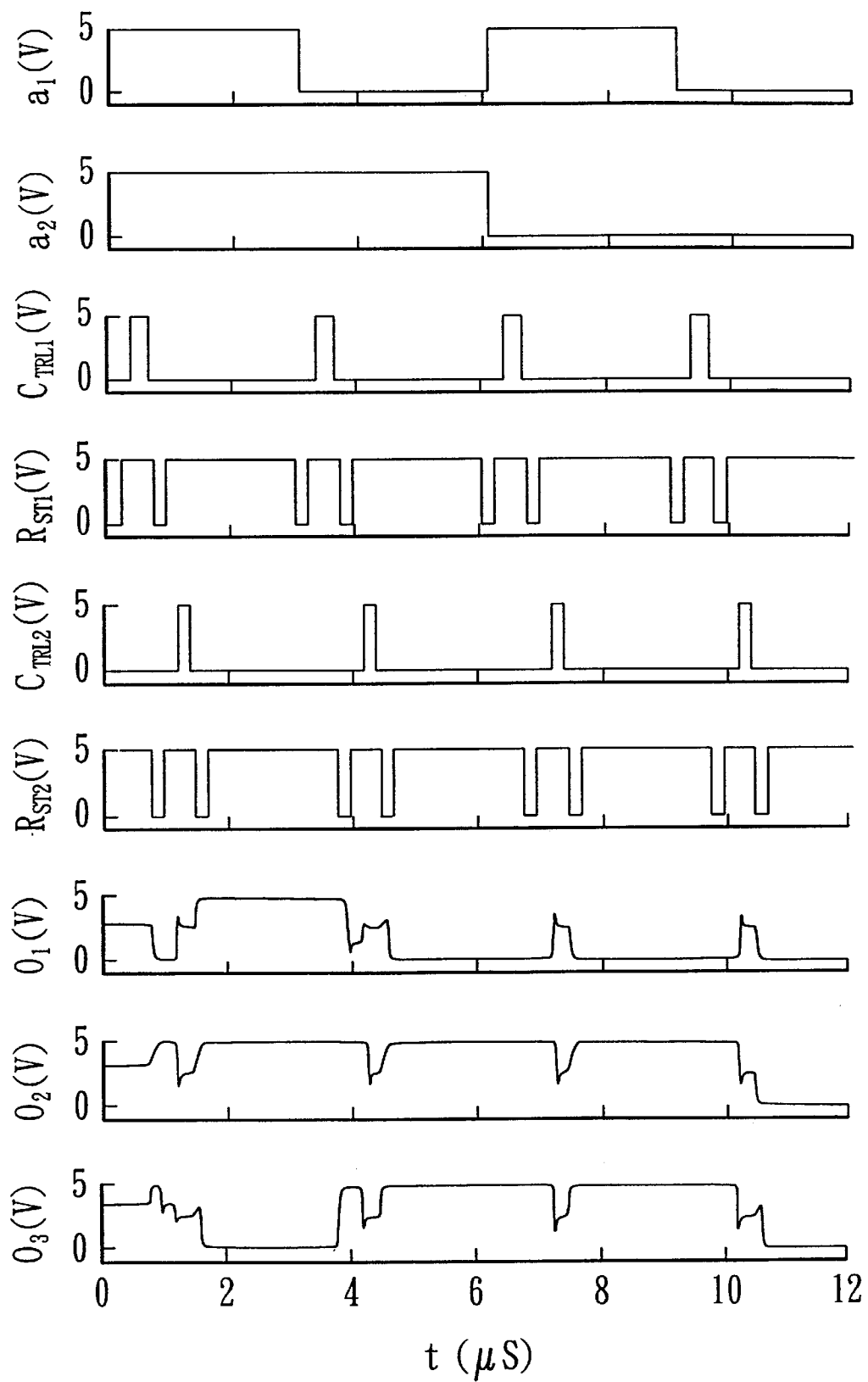
FIG. 6c is the simulation result of the circuit structure shown in FIG. 6b.

The simulation result is shown in FIG. 6c, where $o_1$, $o_2$ and $o_3$ are AND, OR and XOR recognition results respectively. There are 4 combinations for $a_1$ and $a_2$ during the simulation, in each combination after the calculations of hidden and output layers which take about 1.5 μs, the correct recognition results are generated. To make the results easy to recognize, the idle time is added between each combination, so the whole recognition process takes about 12 μs. Ideally, it can be finished in 2 μs, which is more than 1000 times faster than the speed of the Matlab simulation on the SUM Ultra10 workstation, wherein Matlab is an integrated technical computing environment that combines numeric computation, advanced graphics and visualization, and a high-level programming language.

This embodiment provides the digital-analog hybrid structure with pulse stream technique combining the merits of analog and digital techniques. That is, the structure has the advantages of a small chip area, fast speed and low power consumption in analog circuits and the advantages of high precision and robustness in digital circuit. It uses a digital signal to control analog multiplication, so the area of synapse analog multiplier is small and the neuron digital state signal is immune to noises.

Although the invention has been described in its preferred embodiment, it is not intended to limit the invention to the precise embodiment disclosed herein. Those who are skilled in this technology can still make various alterations and modifications without departing from the scope and spirit of this invention. Therefore, the scope of the invention shall be defined and protected by the following claims and their equivalents.

What is claimed is:

1. A voltage-mode pulse width modulation (PWM) VLSI implementation of neural networks, comprising:
   a voltage-pulse converter for converting an input voltage into a neuron-state pulse, wherein the voltage-pulse converter comprises a comparator to control the width of the neuron-state pulse proportional to the input voltage;
   a synapse multiplier, including a multiplier cell for multiplying the neuron-state pulse by an input weight voltage and an integral and summation cell for integrating and summing up the multiplied output and producing a first output voltage; and
   a sigmoid circuit for converting the first output voltage into a second output voltage.

2. The implementation of claim 1, wherein the comparator is controlled by adjusting the traditional weight learning algorithm.

3. The implementation of claim 1, wherein the second output voltage is a sigmoid form.

4. A voltage-mode pulse width modulation (PWM) VLSI implementation of neural networks, comprising:
   a voltage-pulse converter for converting an input voltage into a neuron-state pulse;
   a synapse multiplier, including a multiplier cell for multiplying the neuron-state pulse by an input weight voltage and an integral and summation cell for integrating and summing up the multiplied output and producing a first output voltage; and
   a sigmoid circuit for converting the first output voltage into a second output voltage, wherein the second output voltage is adjustable by a gain-controlling voltage of 1.6V externally inputted.

5. The implementation of claim 4 wherein the second voltage output is expressed by a non-linear activation function of neuron when the gain-controlling voltage is 1.6V, the non-linear activation function of neuron is represented by the equation as follows:

$$V_{out} = \frac{5}{1 + e^{-4(V_{IN} - 2.5)}}$$

where Vout is the second voltage output and VIN is the first voltage output.

6. The implementation of claim 5, wherein the $V_{IN}$ is represented by the equation as follows:

$$V_{IN}(V) - 2.5 = (V_w(V) - 2.5) \times \frac{T_{WIDTH}(ns)}{126}$$

where $V_{IN}(V)$ is the first voltage output, $V_W$ is the weight voltage input, and $T_{WIDTH}$ is the ideal function of the voltage-pulse converter.

7. The implementation of claim 6, wherein the $T_{WIDTH}$ is represented by the equation as follows:

$$T_{WIDTH}(ns) = 42.1 \times Vv$$

where Vv is an input voltage externally.

8. The implementation of claim 7, wherein the value of Vv is a constant.

9. The implementation of claim 7, wherein the value of Vv is changeable.

10. A voltage-mode pulse width modulation (PWM) VLSI implementation of neural networks, comprising:
    three first voltage-pulse converters, each having a first voltage input connected to a first input voltage externally, a first controlling signal input connected to a first controlling signal externally and a first pulse voltage output;
    six first multiplier cells, each having an input, a first weight voltage input and a first current output, wherein every two of the first inputs is respectively connected to one of the first pulse voltage outputs and the first weight voltage input is connected to a first weight voltage externally;
    two first summation cells, each having a first input connected to the corresponding half of the first current outputs, a first reset input connected to a first reset control signal externally, and a first voltage output;
    two first sigmoid circuits, each having a second input connected to the respective first voltage output, a gain-controlling voltage input connected to a gain-controlling voltage, and a second voltage output;
    three second voltage-pulse converters, each having a second voltage input, a second controlling signal input connected to the second controlling signal and a second pulse voltage output, wherein two second voltage inputs are respectively connected to the second voltage outputs of the two first sigmoid circuits, one second voltage input is connected to a second input voltage externally;
    three second multiplier cells, each having a third input connected to the second pulse voltage output, a second weight voltage input connected to a weight voltage externally and a second current output, wherein all second current outputs are connected together to form an output;
    a second summation cell, having a fourth input connected to the output of the three second multiplier cells, a second reset input connected to a second reset control signal externally, and a third voltage output; and
    a second sigmoid circuit, having a fifth input connected to the third voltage output, a second gain-controlling voltage input connected to a gain-controlling voltage, and a fourth voltage output.

11. The implementation of claim 10, wherein the voltage-pulse converter further comprises a comparator.

12. The implementation of claim 11, wherein the comparator is controlled by adjusting the traditional weight learning algorithm.

13. The implementation of claim 10, wherein the gain-controlling voltage is 1.6V.

14. The implementation of claim 10, wherein the second voltage output is expressed by a non-linear activation function of neuron when the gain-controlling voltage is 1.6V, the non-linear activation function of neuron is represented by the equation as follows:

$$V_{out} = \frac{5}{1 + e^{-4(V_{IN} - 2.5)}}$$

where $V_{out}$ is the second voltage output and $V_{IN}$ is the first voltage output.

15. The implementation of claim 14, wherein the fourth voltage output is expressed by a non-linear activation function of neuron when the gain-controlling voltage is 1.6V, the non-linear activation function of neuron is represented by the equation as follows:

$$V_{out} = \frac{5}{1 + e^{-4(V_{IN} - 2.5)}}$$

where $V_{out}$ is the fourth voltage output and $V_{IN}$ is the third voltage output.

16. The implementation of claim 15, wherein the $V_{IN}$ is represented by the equation as follows:

$$V_{IN}(V) - 2.5 = (V_w(V) - 2.5) \times \frac{T_{WIDTH}(ns)}{126}$$

where $V_{IN}(V)$ is the first voltage output, $V_w$ is the weight voltage input, and $T_{WIDTH}$ is the ideal function of the voltage-pulse converter.

17. The implementation of claim 16, wherein the $T_{WIDTH}$ is represented by the equation as follows:

$$T_{WIDTH}(ns) = 42.1 \times Vv$$

where Vv is an input voltage externally.

18. The implementation of claim 17, wherein the value of Vv is a constant.

19. The implementation of claim 17, wherein the value of Vv is changeable.

* * * * *